United States Patent [19]

Vaitys

[11] 4,004,667
[45] Jan. 25, 1977

[54] OVERLOAD CLUTCH WITH ZERO PARASITIC TORQUE

[75] Inventor: Ramojus P. Vaitys, Evanston, Ill.

[73] Assignee: The United States of America as represented by the Secretary of the Air Force, Washington, D.C.

[22] Filed: Sept. 24, 1974

[21] Appl. No.: 508,946

Related U.S. Application Data

[63] Continuation-in-part of Ser. No. 314,623, Dec. 13, 1972, abandoned.

[52] U.S. Cl. .............................. 192/56 R; 192/46; 192/89 B
[51] Int. Cl.² ........................................ F16D 7/02
[58] Field of Search ................ 192/56 R, 46, 89 B, 192/106 R, 89 QT, 103 C, 70.16, 70.17

[56] References Cited
UNITED STATES PATENTS

| 3,435,931 | 4/1969 | Paterson et al. | 192/89 B X |
| 3,608,691 | 9/1971 | Rosenberg | 192/56 R X |

Primary Examiner—Benjamin W. Wyche
Assistant Examiner—Frank H. McKenzie, Jr.
Attorney, Agent, or Firm—Joseph E. Rusz; Arsen Tashjian

[57] ABSTRACT

An overload release clutch having a driving rotor mounted on an input shaft and a driven disk mounted on an output shaft. A shuttle rotor having saw-tooth shaped teeth on its perimeter rides on a splined hub which is an integral part of the driving rotor and engages complementary teeth on the perimeter of the driven disk. Laminated leaf springs are held in position by means of rocker bars which insure that no portion of the torque is transmitted through the leaf springs. In the buckled state, the leaf springs exert a compressive force against the shuttle rotor to maintain it in full mesh with the driven disk during the engagement cycle. Disengagement occurs when a sudden increase in torque in the output shaft causes the driven disk to rotate and force the shuttle rotor axially upward until the buckled leaf springs snap "overcenter" and hold the two toothed members apart. The clutch is reset by manually forcing the shuttle disk downward to rebuckle the leaf springs and thereby hold the toothed members in engagement as before.

3 Claims, 6 Drawing Figures

OVERLOAD CLUTCH WITH ZERO PARASITIC TORQUE

STATEMENT OF GOVERNMENT INTEREST

The Invention described herein may be manufactured and used by or for the United States Government for governmental purposes without the payment of any royalties thereon.

CROSS REFERENCE TO RELATED APPLICATION

This application is a continuation-in-part of application Ser. No. 314,623, filed Dec. 13, 1972, now abandoned.

BACKGROUND OF THE INVENTION

This invention relates to an overload release clutch and, more particularly, the invention is concerned with providing a clutch system capable of transmitting rewind torque and pretension of a tape for use in an aircraft arresting system for land or ships based hook-equipped aircraft.

Most currently available arresting systems are composed of two identical arresting units emplaced one on each side of the runway and an interconnecting deck pendant - purchase tape assembly that stretches across the runway. Each arrester unit includes an energy absorber module which is designed to be either directly ground emplaced or secured to the ground by means of earth anchors. Also, the arrester unit may be mounted in situ on concrete foundations with anchor bolts. Suitable weather protection is provided to prevent freezing rain and snow buildup from interfering with the proper operation of the functional elements.

In a typical arrester unit, the energy absorber module includes a runway-edge sheave assembly through which the primary purchase tape is reeved. This tape then stretches for some 60 to 500 ft (depending on the requirements of each particular installation) at right angles to the runway until it makes contact with a stationary sheave, mounted on the baseplate of the energy absorber module which changes the direction of the tape. From here the tape runs through a linear brake, down a protective tube until it reaches the movable sheave block, through which it is reeved. From this block the primary tape runs back toward the energy absorber module so that a loop, called the auxiliary payout loop, is formed. Then the tape passes through a set of brushes, over another stationary sheave, and finally enters the primary tape reel. The primary tape reel is keyed to the vertical cantilevered end of an energy absorber shaft which is for example, a rotary hydrodynamic device whose cylindrical housing is bolted to the base plate of the energy absorber module. A secondary reel having caliper-disk type dry friction brakes is also included in the system for operation during the aircraft arrestment.

A diesel engine mounted on the base plate provides power for rewinding the tape on the primary storage reel. A transmission including a torque converter and a back-stop clutch is bolted to the bell housing of this engine. The output shaft from the transmission is coupled to a worm gear reducer having an output shaft which carries a sprocket for transmitting the rewind power to the primary reel.

Between the back-stop clutch and the primary tape reel it is necessary to provide an overload clutch device which is capable of transmitting rotary motion at zero slip when the resisting torque at the output shaft is below a certain critical value known as the tripping torque, and of disengaging suddenly once the resisting torque level exceeds the tripping torque. Upon disengagement, the output shaft should freewheel in either direction at an essentially zero parasitic torque while the input torque also drops to zero. The hereinafter described overload clutch will operate in the manner described and is particularly useful in an aircraft-arresting system.

SUMMARY OF THE INVENTION

The present invention is concerned with providing an overload clutch for use as part of the tape rewind power train of an aircraft arresting system. The clutch transmits rotary motion at zero slip during rewind and will disengage suddenly and completely when the tripping torque level is exceeded. A driving rotor mounted on an input shaft includes a splined hub portion upon which a shuttle rotor is slidably mounted. A driven disk is mounted on an output shaft for engagement with the shuttle rotor. Both the driven disk and shuttle rotor are provided with complementary saw-tooth-shaped teeth on their respective perimeters such that full mesh engagement occurs when the members are held together by biasing means which includes a plurality of leaf springs having their ends fitted into corresponding recesses in rocker bars propped against shelves protruding from the shuttle and driving rotors. A sudden increase in torque of the output shaft causes the toothed members to disengage and permit the output shaft to freewheel.

Accordingly, it is an object of this invention to provide an overload clutch with zero parasitic torque for transmitting rotary motion at zero slip when the resisting torque at the output shaft is below a predetermined critical value known as the tripping torque.

Another object of the invention is to provide an overload clutch which will disengage suddenly once the resisting torque level exceeds the tripping torque which can be accurately adjusted to obtain fine control of the level thereof.

Still another object of the invention is to provide an overload clutch wherein the output shaft can freewheel in either direction upon disengagement at an essentially zero parasitic torque. The input torque also drops to zero.

A further object of the invention is to provide an overload clutch suitable for use as a part of the tape rewind power train in an aircraft-arresting system. The clutch operates to pretension the purchase tape to a predetermined tape tension level by statically transmitting a torque and maintaining the tape in quiescent state below the tripping torque.

A still further object of the invention is to provide an overload clutch wherein a sudden increase in the tape pretension force produces a corresponding increase in the output shaft torque level causing the overload clutch to trip or disengage and allow the tape reel operatively attached to the output shaft to freewheel.

Another still further object of the invention is to provide an overload clutch wherein a driven disk is mounted on the output shaft and a driving rotor is mounted on the input shaft. A shuttling rotor rides on a splined hub which is an integral part of the driving rotor.

These and other objects, features and advantages will become more apparent after considering the following description taken in conjunction with the annexed drawings and appended claims.

DESCRIPTION OF THE PREFERRED EMBODIMENT

Figure 1:
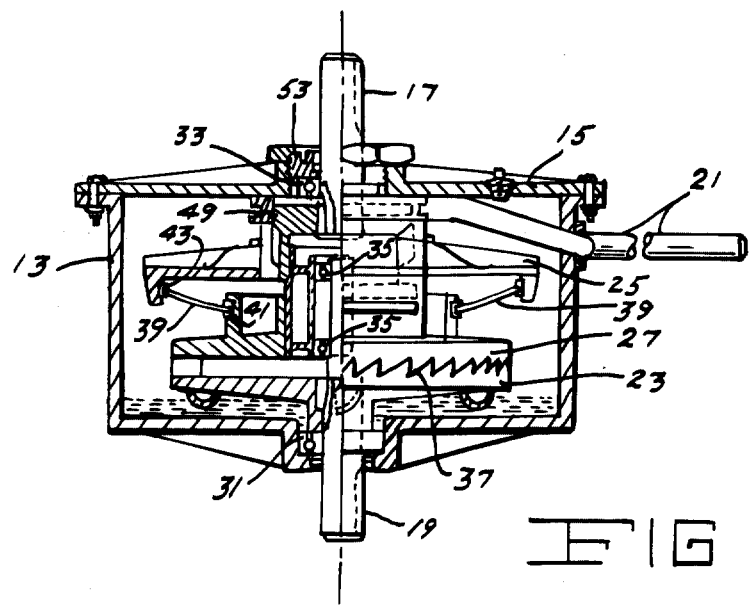
FIG. 1 is a view in partial cross-section showing the overload clutch in engagement with the cylindrical housing and three concentric rotating components according to the invention.

Referring now to the drawings, the hereinafter disclosed device is particularly suitable for use in an aircraft-arresting system as a reel-release clutch although it can be utilized in any general application as an overload clutch. The overload clutch is housed in a short cylindrical container 13 having a cover member 15. An input shaft 17 protrudes through the cover member 15 and an output shaft 19 protrudes through the bottom of the container 13. A reset lever 21 extends through the side of the container 13 and is movable upward and downward.

The clutch includes three concentric rotating components in the housing 13. A driven disk 23 is mounted on the output shaft 19 and a driving rotor 25 is mounted on the input shaft 17. A shuttling rotor 27 rides on a splined hub 29 which is an integral part of the driving rotor 25. The rotating components 23 and 25 are supported by and rotate on the ball bearings 31 and 33 respectively while two other bearings 35 are pressed onto the output shaft 19 that extends into the hub of the driving rotor 25.

Figure 2:
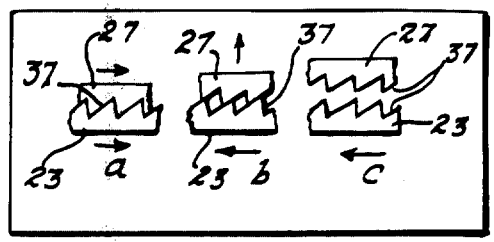
FIG. 2 is a pictorial view of the saw-tooth shaped teeth of the shuttle rotor and driven disk during the rewind, disengagement and unwinding cycles.
Figure 4:
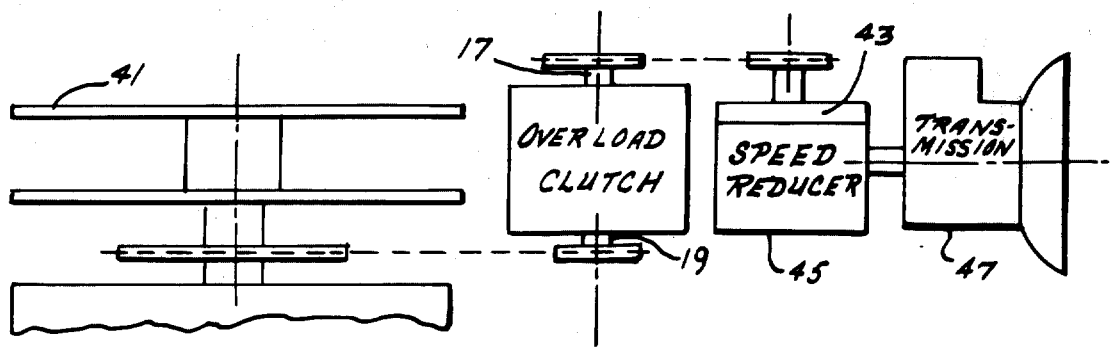
FIG. 4 is a schematic of the rewind drive train showing the position of the clutch in relation to the other elements of the aircraft-arresting system.
Figure 3A:
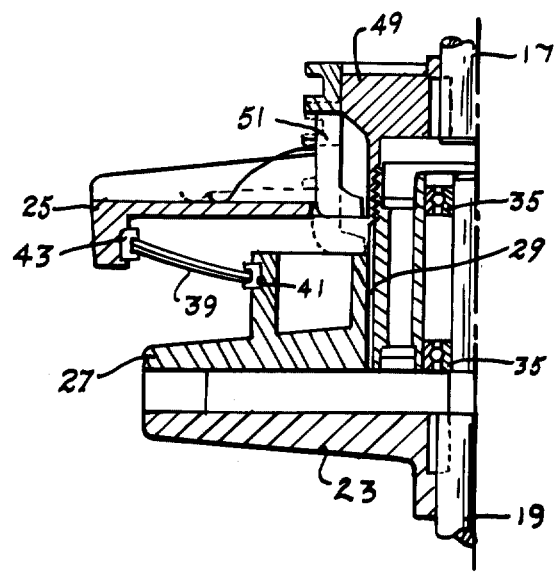
FIG. 3a shows the clutch in the engaged position during the rewind cycle.
Figure 3B:
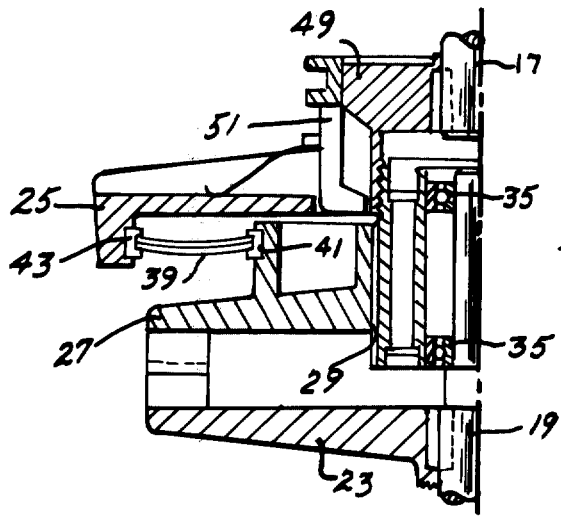
FIG. 3b shows the clutch going overcenter during the disengagement cycle.
Figure 3C:
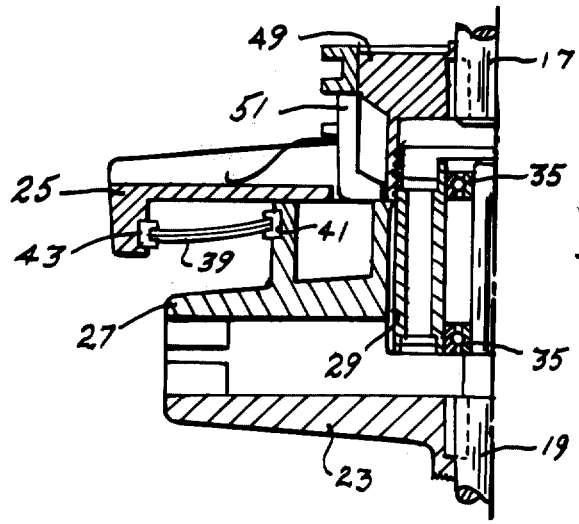
FIG. 3c shows the clutch disengaged to allow the driven disk to freewheel.

The driven disk 23 and the shuttling rotor 27 both incorporate saw-tooth-shaped clutch teeth 37 along their respective perimeters. As shown in FIGS. 1 and 2a, these tooth equipped parts are meshed which is the engaged position of the clutch. The driving torque is transmitted by means of normal and frictional forces between the sloping faces of the teeth 37. The required axial force to keep the driven disk 23 and the shuttling rotor 27 in full mesh is supplied by four laminated leaf springs 39. Each leaf spring consists of several almost flat, rectangular spring-steel sheets that exert a compressive force by virtue of being in a buckled state. Each loaded edge of each spring 39 rests in a recess of a rocker bar. Four such rocker bars 41 are propped against four shelves on the outer wall of the shuttle rotor 27; four other rocker bars 43 are supported by four on the inner wall of the driving rotor 20. The function of these rocker bars 41 and 43 is to provide an arrangement which is in effect a torque limiting device for disengagement at controllable and reproducible levels of transmitted torque. The rocker bars 41 and 43 thus insure that no portion of the torque is transmitted through the leaf springs 39. The threshold torque value for disengagement is solely a function of the "ratchet tooth" angle, axial force exerted by the leaf springs 39, and the coefficient of sliding friction between the teeth and at the splines 29.

The driven disk 23 and the shuttle rotor 27 remain meshed during the entire rewind and pretensioning phase and also for all subsequent time when the arresting system is in battery and awaiting an arrestment. The automatic declutching action takes place only when the resisting torque at the output shaft 19 exceeds a certain critical value. Then, the driven disk 23 powered by the primary reel 41 paying out its tape (not shown), starts rotating in the direction shown in FIG. 2b. However, the driving rotor 25 cannot rotate because the backstop clutch 43 on the speed reducer 45 prevents this. Consequently, the rotation of the driven disk 23 pushes the shuttle rotor 27 axially upward, thereby compressing the leaf springs 39 even further. After a certain predetermined amount of axial motion, the leaf springs 39 attain their maximum compression, FIG. 2b and from that point on they start unloading, thereby reversing the direction of axial force they previously exerted on the shuttle rotor 27. The shuttle rotor 27 thus snaps overcenter and the clutch disengagement is complete there being a gap between the tips of the teeth 37 of the previously meshed parts as shown in FIG. 2c.

MODE OF OPERATION

In operation, the herein described overload clutch is used in an aircraft arresting system as part of the tape rewind power train and it is called upon to first transmit rotary motion at zero slip when the resisting torque at the output shaft 19 is below a certain critical value known as the tripping torque. This function is performed while the rewind engine is doing the purchase tape rewinding during which the tape is being wound on its storage reel 41 to which the requisite motion is transmitted by the overload clutch. The rewind phase is terminated by pretensioning the purchase tape to a tape tension level that is a function of the stall torque delivered by a torque converter which is a part of the transmission 47 operatively connected to the rewind engine (not shown). The rewind engine is then throttled down and manually decoupled and the just-established tape pretension is maintained by the backstop clutch 43 located between the torque converter and the overload clutch. The backstop clutch 43 prevents the decoupled tape reel 41 from rotating in the direction that would cause an unloading of the tape tension. A quiescent state is thus established during which the overload clutch is statically transmitting a torque between the backstop clutch 43 and the tape reel 41. To maintain this quiescent state indefinitely the overload clutch is so proportioned that the applied pretension torque is well below the tripping torque.

The second function of the overload clutch is to disengage suddenly once the resisting torque level exceeds the tripping torque. Upon disengagement the output shaft 19 can freewheel in either direction at an essentially zero parasitic torque while the input torque also drops to zero. This second function comes into play during an aircraft arrestment when the landing aircraft with its arresting hook produces longitudinal stress waves in the pendant as well as in the purchase tape. This stress wave manifests itself as a sudden jump in the tape pretension force and, consequently, there is a sudden increase in the torque level at the output shaft 19 of the overload clutch. Since, in all arrestment cases this initial pendant engagement generated torque will be several times higher than the tripping torque of the overload clutch, that latter will suddenly disengage or trip so that from that moment on the tape reel 41 is free to rotate in the unwinding direction. Meanwhile, the input shaft 17 of the overload clutch remains stationary, held fast by the backstop clutch 43.

After the arrestment of the aircraft is completed, the overload clutch must be reset. This is done manually by throwing the reset lever 21 whose yoked end 49 inside the clutch housing 13 shifts the sliding collar 51 downward. Four axially oriented fingers of the collar 51 bear down on the shuttle rotor 27 and cause it to slide again with an over-center-snapping action back into the teeth-meshed position shown in FIG. 1. The clutch is now ready for commencement of the reel rewind phase.

The clutch tripping torque can be adjusted by either varying the number and/or thickness of leaves in each of the leaf springs 39 or varying the degree to which the springs are compressed. The latter method is especially useful for the final, fine adjustment after the clutch has been assembled. This adjustment is accomplished by turning the torque adjusting nut 53 by means of a spanner wrench or the like which causes the driving rotor 25 to approach or recede from the shuttle rotor 27 by small amounts. This change in relative axial positions of these two rotating parts has the effect of changing the preset force in the leaf springs 39 and, consequently, regulating the level of the tripping torque.

Although the invention has been illustrated in the accompanying drawings and described in the foregoing specification in terms of a preferred embodiment thereof, the invention is not limited to this embodiment or to the preferred configuration mentioned. It will be apparent to those skilled in the art this my invention could have extensive use in other operations where it is desirable to transmit a requisite torque during an initial phase and to maintain this torque for an indefinite period of time and, further, to disengage immediately and completely when a sudden increase in the torque level occurs.

Having thus set forth and disclosed the nature of my invention, what I claim and desire to secure by Letters Patent of the United States is:

1. An overload clutch for use in an aircraft arrestment system, said clutch comprising a cylindrical housing having a cover, an input shaft axially disposed within said housing and extending upwardly through the cover thereof, a driving rotor mounted in said housing on said input shaft, a splined hub integral with said driving rotor and extending downwardly therefrom, a shuttle rotor slidably mounted on said splined hub for axial movement thereon, an output shaft axially disposed within said housing and extending downwardly through the bottom thereof, a driven disk mounted on said output shaft, a plurality of shelves on the inner wall of said driving rotor, a corresponding plurality of shelves on the outer wall of said shuttle rotor, a rocker bar positioned on each of said plurality of shelves, a plurality of leaf springs disposed between said rocker bars such that each end portion of each of said leaf springs is juxtaposed against one of said rocker bars, said leaf springs being normally in the buckled state to exert a compressive force for maintaining said shuttle rotor in engagement with said driven disk during rotation of said driving rotor, said leaf springs transforming to the unbuckled state in response to upward axial movement of said shuttle rotor caused by a sudden application of torque above a predetermined level to said output shaft, said shuttle rotor being held in disengagement from said driven shaft by said unbuckled leaf springs, and means for resetting said shuttle rotor into operative engagement with said driven disk for rotation by said driving rotor.

2. The overload clutch defined in claim 1 wherein said shuttle rotor and said driven disk include a plurality of complementary saw-tooth shaped teeth on their outer perimeter, said teeth being in full mesh during the engagement cycle of said clutch for transmitting the driving torque to said output shaft.

3. The overload clutch defined in claim 2 wherein the means for resetting said shuttle rotor into operative engagement with said driven disk includes a reset lever extending outwardly from the side of said housing, the inner end of said reset lever operating to force said toothed shuttle rotor downward to engage the teeth on said driven disk in response to upward movement of the outer end of said reset lever, said leaf springs maintaining said toothed members operative in engagement during rotation of said driving rotor.

* * * * *